United States Patent
Haensgen et al.

(10) Patent No.: US 10,108,216 B2
(45) Date of Patent: Oct. 23, 2018

(54) POWER TAP WITH ADJUSTABLE CONFIGURATION

(71) Applicant: ROCKWELL AUTOMATION TECHNOLOGIES, INC., Mayfield Heights, OH (US)

(72) Inventors: Steven T Haensgen, Mukwonago, WI (US); John P Caspers, Racine, WI (US); Yutao T Wang, Brookfield, WI (US); Jeffrey A Kilburn, Hartland, WI (US); Darryl E Whitley, Milwaukee, WI (US)

(73) Assignee: ROCKWELL AUTOMATION TECHNOLOGIES, INC., Mayfield Heights, OH (US)

(*) Notice: Subject to any disclaimer, the term of this patent is extended or adjusted under 35 U.S.C. 154(b) by 79 days.

(21) Appl. No.: 15/217,357

(22) Filed: Jul. 22, 2016

(65) Prior Publication Data

US 2018/0024583 A1    Jan. 25, 2018

(51) Int. Cl.
| | |
|---|---|
| *G05F 1/66* | (2006.01) |
| *H02M 7/04* | (2006.01) |
| *G06F 1/26* | (2006.01) |
| *G06F 1/32* | (2006.01) |
| *H02J 3/14* | (2006.01) |
| *G05B 19/05* | (2006.01) |
| *G05B 23/02* | (2006.01) |

(52) U.S. Cl.
CPC ............. *G05F 1/66* (2013.01); *G06F 1/26* (2013.01); *G06F 1/3203* (2013.01); *H02J 3/14* (2013.01); *H02M 7/04* (2013.01); *G05B 19/058* (2013.01); *G05B 23/02* (2013.01); *G05B 2219/15097* (2013.01)

(58) Field of Classification Search
CPC ............... G05F 1/66; G06F 1/26; H02M 7/04
See application file for complete search history.

(56) References Cited

U.S. PATENT DOCUMENTS

| | | | |
|---|---|---|---|
| 4,095,862 | A | 6/1978 | Hatch |
| 4,252,396 | A | 2/1981 | Wilson |
| 4,359,257 | A | 11/1982 | Lopinski et al. |
| 4,641,904 | A | 2/1987 | Kosugi et al. |

(Continued)

FOREIGN PATENT DOCUMENTS

| | | |
|---|---|---|
| CN | 2648674 Y | 10/2004 |
| EP | 1967929 A2 | 9/2008 |

(Continued)

OTHER PUBLICATIONS

Siemens, Simatic Net, AS-Interface—Introduction and Basics Manual, Release Apr. 2006, 62 pages.

(Continued)

*Primary Examiner* — Stefan Stoynov
(74) *Attorney, Agent, or Firm* — Quarles & Brady LLP

(57) ABSTRACT

Systems and methods are provided for a power tap with adjustable configuration. The power tap includes a circuit board that acts on the adjustable configuration to define the function of the power tap in the system. The power tap may include a microcontroller or a set of discrete logic disposed on a circuit board connected to an adjustable configuration mechanism, which defines the intelligent power tap's function in the network system.

17 Claims, 8 Drawing Sheets

(56) References Cited

U.S. PATENT DOCUMENTS

| | | | |
|---|---|---|---|
| 4,773,876 | A | 9/1988 | Nakamura et al. |
| 5,059,137 | A | 10/1991 | Dale et al. |
| 5,242,313 | A | 9/1993 | Logerot et al. |
| 5,242,314 | A | 9/1993 | Di Giulio et al. |
| 6,074,238 | A | 6/2000 | DeRoss et al. |
| 6,232,557 | B1 | 5/2001 | Lounsbury et al. |
| 6,394,833 | B1 | 5/2002 | Bulmer et al. |
| 6,400,103 | B1* | 6/2002 | Adamson ............ H04L 12/2803 315/292 |
| 6,425,770 | B1 | 7/2002 | Lostoski et al. |
| 6,442,144 | B1 | 8/2002 | Hansen et al. |
| 6,732,202 | B1* | 5/2004 | Ying .................. G05B 19/042 235/375 |
| 6,935,885 | B2 | 8/2005 | Scherer et al. |
| 7,080,150 | B1 | 7/2006 | Wehrle et al. |
| 7,112,073 | B2 | 9/2006 | Morlok |
| 7,228,363 | B1 | 6/2007 | Wehrle et al. |
| 7,313,607 | B1 | 12/2007 | Rosenberg |
| 7,412,530 | B1 | 8/2008 | Wehrle et al. |
| 7,483,396 | B2 | 1/2009 | Steindl |
| 7,721,079 | B2 | 5/2010 | Wehrle et al. |
| 8,433,827 | B2 | 4/2013 | Biehler |
| 9,813,290 | B2 | 11/2017 | Saltsidis |
| 9,876,674 | B1 | 1/2018 | Murray et al. |
| 2002/0184573 | A1* | 12/2002 | Rousseau .......... H04L 12/40123 714/43 |
| 2004/0158713 | A1 | 8/2004 | Aneweer et al. |
| 2005/0021738 | A1 | 1/2005 | Goeller et al. |
| 2005/0024026 | A1 | 2/2005 | Hung et al. |
| 2005/0243739 | A1 | 11/2005 | Anderson et al. |
| 2005/0262218 | A1 | 11/2005 | Cox et al. |
| 2008/0192650 | A1 | 8/2008 | Kolhi |
| 2008/0281947 | A1 | 11/2008 | Kumar |
| 2009/0198385 | A1 | 8/2009 | Oe et al. |
| 2009/0205022 | A1 | 8/2009 | Sanchez et al. |
| 2010/0030345 | A1 | 2/2010 | Cole et al. |
| 2010/0186229 | A1 | 7/2010 | Enomoto et al. |
| 2010/0205271 | A1 | 8/2010 | Callaghan |
| 2010/0205281 | A1 | 8/2010 | Porter et al. |
| 2011/0222200 | A1 | 9/2011 | Fuller et al. |
| 2012/0066356 | A1 | 3/2012 | Nguyen et al. |
| 2012/0253540 | A1 | 10/2012 | Coyne et al. |
| 2012/0258726 | A1 | 10/2012 | Bansal et al. |
| 2013/0073760 | A1 | 3/2013 | Wiesgickl |
| 2013/0275566 | A1 | 10/2013 | Huth et al. |
| 2013/0288640 | A1 | 10/2013 | Bonner |
| 2014/0258455 | A1 | 9/2014 | Julicher |
| 2014/0280881 | A1 | 9/2014 | Szamonek et al. |
| 2015/0117244 | A1 | 4/2015 | Williamson |
| 2015/0201101 | A1 | 7/2015 | Kaminushi |
| 2015/0256389 | A1 | 9/2015 | Ruess et al. |
| 2015/0350229 | A1 | 12/2015 | Mitchel |
| 2016/0006628 | A1 | 1/2016 | Herring et al. |
| 2016/0013948 | A1 | 1/2016 | Moses |
| 2016/0070282 | A1 | 3/2016 | Chapel et al. |
| 2016/0139999 | A1 | 5/2016 | Gabler et al. |
| 2016/0269373 | A1 | 9/2016 | White et al. |
| 2017/0025892 | A1 | 1/2017 | Van Ostrand et al. |
| 2017/0026441 | A1 | 1/2017 | Moudy et al. |
| 2017/0134477 | A1 | 5/2017 | Ben Dayan et al. |
| 2017/0237556 | A9 | 8/2017 | Denning et al. |
| 2017/0272452 | A1 | 9/2017 | Kraemer et al. |
| 2017/0303079 | A1 | 10/2017 | Ikemoto et al. |

FOREIGN PATENT DOCUMENTS

| | | |
|---|---|---|
| EP | 1983616 A2 | 10/2008 |
| GB | 2442304 B | 10/2008 |
| KR | 1020110017576 A | 2/2011 |
| WO | 03023634 A1 | 3/2003 |
| WO | 2006089718 A2 | 8/2006 |
| WO | 2009150527 A1 | 12/2009 |

OTHER PUBLICATIONS

Anderson, et al., Automated Power Distribution System Hardware, In Energy Conversion Engineering Conference, 1989, IECEC-89, Proceedings of the 24th Intersociety, pp. 579-584, IEEE, 1989.

Burgess, How to Assign a Static IP Address in Windows 7, 8, 10, XP, or Vista, Nov. 10, 2013, https://www.howtogeek.com/howto/19249/how-to-assign-a-static-ip-address-in-xp-vista-or-windows-7/, 17 pages.

Matray, et al., On the Network Geography of the Internet, In INFOCOM, 2011 Proceedings IEEE, pp. 126-130, IEEE, 2011.

Moyne, et al., The Emergence of Industrial Control Networks for Manufacturing Control, Diagnostics, and Safety Data, Proceedings of the IEEE, 2007, 95(1):29-47.

Satchell, How Can I Configure a DHCP Server to Assign Addresses Based on the OS that is Running, https://lists.isc.org/pipermail/dhcp-users/2010-May/011783.html, May 2010, 9 pages.

European Patent Office, Extended European Search Report, EP 17177835.0, dated Jan. 2, 2018, 10 pages.

European Patent Office, Extended European Search Report, EP 17178251.9, dated Sep. 27, 2017; 8 pages.

European Patent Office, Partial European Search Report, EP 17178252.7, dated Jan. 3, 2018, 15 pages.

European Patent Office, Extended European Search Report, EP 17178252.7, dated Mar. 27, 2018; 18 pages.

European Patent Office, Extended European Search Report, EP 17178254.3, dated Oct. 5, 2017, 8 pages.

European Patent Office, Extended European Search Report, EP 17178256.8, dated Nov. 30, 2017, 7 pages.

European Search Report; Appln No. 17178258.4-1808; dated Dec. 20, 2017; 9 pages.

\* cited by examiner

POWER TAP WITH ADJUSTABLE CONFIGURATION

BACKGROUND

The subject matter disclosed within relates generally to a device in a control system, and more particularly to a power tap with adjustable configuration.

Control systems are at the core of modern manufacturing. These systems control diverse processes from steel and automotive products to mass distribution products associated with food and beverages, for example. In general, control systems require a processor and related program to direct a related system of Input/Output (I/O) interfaces (e.g., I/O modules) which in turn report and control industrial processes. I/O modules may be selected to perform digital style (e.g., 120V input/output) and/or analog style control (e.g., 4-20 ma input/output), for example. Also, generally associated with control systems are related racks, power supplies and control networks for housing, powering, and communicating with the associated I/O modules.

Over time, industrial system demands have steadily increased. For example, system demands for lower costs and increased flexibility are increasingly necessary for modern factories to compete on the global stage. Lower system costs provide manufacturers with a competitive advantage by realizing a better return on capital investments. Flexibility enables a manufacturer to respond to changing market dynamics as product and sales requirements change. Unfortunately, conventional systems many times are burdensome to install/upgrade and often require manufacturer's to install more system components than necessary. Thus, conventional systems generally do not provide the requisite flexibility and associated lower costs required by modern systems.

One of the solutions that addresses the above increased demands is the emergence of industrial control networks for communicating control and status data between industrial controllers and devices used in control systems such as I/O devices, motor starters, relays, push buttons, drives, etc. These industrial control networks have provided the ability to improve flexibility, increase diagnostics, reduce installation and wiring cost, ease maintainability and generally improve the productivity of manufacturing operations.

However, in current networked industrial control systems, inefficiencies exist when required to connect or wire a power source to each device within the control system. In such systems, a power tap can be used to inject either a network or switched power (often referred to as control power) onto the system communication cable, thereby powering all aspect of devices within the system.

However, the power tap providing power to nodes in control systems generally has a fixed configuration. Human mistakes may cause problems when a wrong power tap is connected at a specific location. In current systems, power taps cannot be configured to define their functions. Thus, there is a need for providing a power tap with adjustable configuration.

BRIEF SUMMARY OF THE INVENTION

The above problems can be solved by providing a power tap with adjustable configuration for more flexibility when injecting power into a network system.

In one aspect, an intelligent power tap is provided in a network system. The intelligent power tap includes a circuit board, a microcontroller disposed on the circuit board, where the microcontroller is configured to provide a status report of the intelligent power tap. The intelligent power tap further includes a physical layer network interface connected to the microcontroller and the network system. The intelligent power tap further includes an adjustable configuration mechanism connected to the microcontroller, where the adjustable configuration mechanism defines the intelligent power tap's function in the network system.

In another aspect, the present disclosure provides a power tap. The power tap includes a circuit board and an adjustable configuration mechanism. The adjustable configuration mechanism independently defines the power tap's function in the network system.

In a third aspect, the present disclosure provides a power tap. The power tap includes a circuit board and a non-communication enabled microcontroller disposed on the circuit board. The power tap further includes an adjustable configuration monitored by the non-communication enabled microcontroller to define the power tap's function in the network system according to the configuration instruction.

These and other benefits may become clearer upon making a thorough review and study of the following detailed description. Further, while the embodiments discussed above can be listed as individual embodiments, it is to be understood that the above embodiments, including all elements contained therein, can be combined in whole or in part.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

Figure 1A:
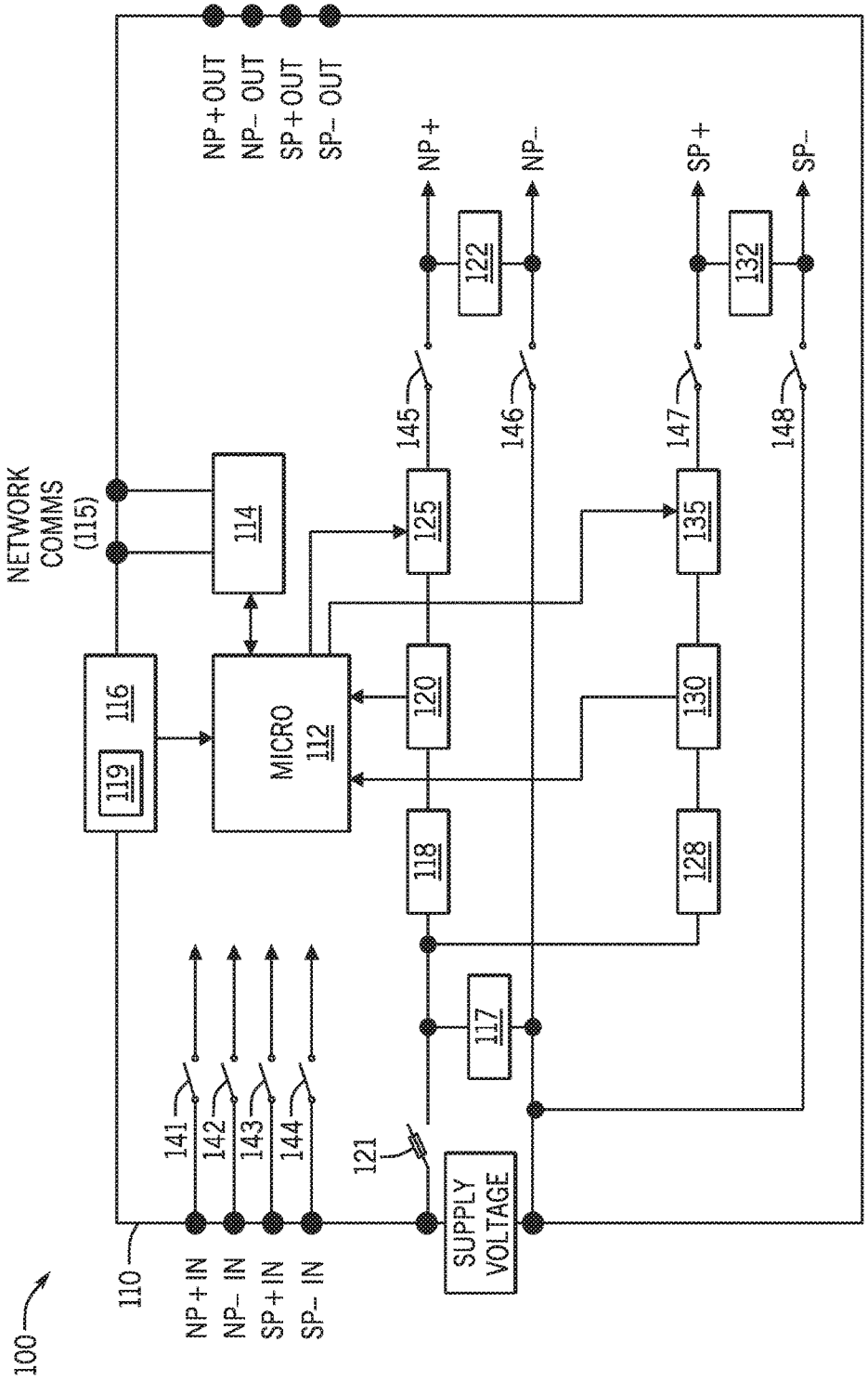
FIG. 1A illustrates an example power tap according to one or more embodiments of the instant application.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1A illustrates an example intelligent power tap according to one or more embodiments of the instant application. In FIG. 1A, the intelligent power tap 100 may be connected to a network system. The intelligent power tap 100 includes a circuit board 110, a microcontroller 112 disposed on the circuit board 110, and a physical layer network interface 114 connected to the microcontroller 112 and the network system. The circuit board 110 may include one or more layers of printed circuit boards (PCB). The microcontroller 112 may include one or more central processing units, which may also be referred to as microprocessor, or host processor, etc. Generally, the microcontroller 112 decides what the received messages mean, what messages it wants to transmit, and what acts to be performed after receiving a certain message.

For example, the physical layer network interface 114 may be connected to a control network system via the Network Comms terminals 115 of the intelligent power tap 100. When receiving a request to provide a status report to another device on the control network system, the microcontroller 112 may send a status report to the requesting device.

The microcontroller 112 communicates as a network node via the network bus connected to a physical layer of the network system. The microcontroller 112 is configured to allow the geographical location of the intelligent power tap to be determined in the network system. The geographical location indicates the location of the intelligent power tap on the network. For example, the geographical location may indicate the left-to-right sequential location of the device on the network cable. The microcontroller 112 is configured to provide a status report of the intelligent power tap 100, where the status report includes the geographical location and other information. The intelligent power tap 100 is configured to inject at least one of a network power and a switched power into the network system. The network power may be injected with a voltage supply, such as 24 Vdc, and a maximum current, such as 4 A via the intelligent power tap 100, which may be used to power communication electronics, Inputs/Outputs, and etc. The switched power may be injected with a voltage supply, such as 24 Vdc, and a maximum current, such as 4 A via the intelligent power tap 100 as well. The switched power may be used to power contactors, relays, and other switching devices/circuits. In this disclosure, the voltage supply may include an AC input when the intelligent power tap 100 includes a switch mode power supply that converts the AC to 24 Vdc.

The microcontroller 112 may be connected to a first voltage sensor 117, a second voltage sensor 122, and a third voltage sensor 132. The first voltage sensor 117 senses an incoming voltage to the intelligent power tap 100. The second voltage sensor 122 senses a network voltage to be injected into the network system. The third voltage sensor 132 senses a switched voltage to be injected into the network system. The intelligent power tap 100 may include additional voltage sensors to measure other voltage signals in the intelligent power tap 100. Based on the sensed voltage signals from the various voltage sensors, the microcontroller 112 may shut off the power output to the network power zone or the switched power zone. Similarly, the user is also provided with ability to shut off or de-energize an entire zone of network power or switched power via a network command. The user may choose to shut off an entire zone for energy saving reasons, safety reasons, regular maintenance, or any other reasons.

The intelligent power tap 100 includes a fuse holder 121 that holds a replaceable fuse connected to the incoming supply voltage, which may be a 24V voltage input that provides power to the microcontroller 112, the network power, and the switched power. The fuse holder 121 may also connect to a first filter circuit 118 and a second filter circuit 128. The intelligent power tap 100 may also include two additional fuse holders similar to 121, one in line with the first filter circuit 118 and one in line with the second filter circuit 128.

As shown in FIG. 1A, the intelligent power tap 100 includes four power input terminals ($NP+_{IN}$, $NP-_{IN}$, $SP+_{IN}$, $SP-_{IN}$) and four power output terminals ($NP+_{OUT}$, $NP-_{OUT}$, $SP+_{OUT}$, $SP-_{OUT}$). The input power terminal $NP+_{IN}$ is an input network power, the input power terminal $NP-_{IN}$ is a ground terminal for the input network power. The input power terminal $SP+_{IN}$ is an input switched power and the terminal $SP-_{IN}$ is a ground terminal for the input switched power. Correspondingly, the output power terminal $NP+_{OUT}$ is an output network power, the output power terminal $NP-_{OUT}$ is a ground terminal for the output network power. The output power terminal $SP+_{OUT}$ is an output switched power and the terminal $SP-_{OUT}$ is a ground terminal for the output switched power.

The intelligent power tap 100 further includes an adjustable configuration mechanism 116 connected to the microcontroller 112. The adjustable configuration mechanism 116 defines the function of the intelligent power tap 100 in the network system. For example, the adjustable configuration mechanism 116 may define how the input power terminals ($NP+_{IN}$, $NP-_{IN}$, $SP+_{IN}$, $SP-_{IN}$) are connected to the output power terminals ($NP+_{OUT}$, $NP-_{OUT}$, $SP+_{OUT}$, $SP-_{OUT}$). The adjustable configuration mechanism 116 may include a selector such as a dip switch, a rotary switch, a rotary knob, a switch knob, a touch screen, etc. By configuring the adjustable configuration mechanism 116, the intelligent power tap 100 may be configured to work in one of the following four modes. In the first mode, the intelligent power tap 100 works as a first tap, which injects network power left (to the bridge or 202 shown in FIG. 2) and right (to downstream nodes) and switched power to right (to downstream nodes). In the second mode, the intelligent power tap 100 works as a network power tap and a switched power tap, which injects network power and switched power to right. In the third mode, the intelligent power tap 100 works as a network power tap only, which injects network power to right. In the fourth mode, the intelligent power tap 100 works as a switched power tap, which injects switched power to right.

The intelligent power tap 100 may also include one or more current sensors. For example, the intelligent power tap 100 includes a current sensor 120 or 130 that senses at least one of a network current and a switched current to be injected into the network system. The first current sensor 120 is connected to a filter circuit 118 and a first switch 125 to shut off the network power. The current sensor 120 also sends the measured current signal to the microcontroller 112. The second current sensor 130 is connected to a second filter circuit 128 and a second switch 135 to shut off the switched power output. The second current sensor 130 also sends the measured current signal to the microcontroller 112. For example, the first switch 125 is configured to shut off the network power into the network system based on a first command received from the microcontroller. The second switch 135 is configured to shut off the switched power into the network system based on a second command received from the microcontroller.

The intelligent power tap 100 may also include current limit circuits in the current sensors 120 and 130. For example, the first current sensor 120 includes a first current limit circuit connected to the first filter circuit and the network power output, where the first current limit circuit allows a first pre-defined excessive network output current during brief periods of high current demand. The second current sensor 130 includes a second current limit circuit connected to the second filter circuit and the switched power output, where the second current limit circuit allows a second pre-defined excessive switched output current during brief periods of high current demand.

The intelligent power tap 100 further includes a plurality of circuits 141, 142, 143, and 144 connected to the input power terminals ($NP+_{IN}$, $NP-_{IN}$, $SP+_{IN}$, $SP-_{IN}$) and the output power terminals ($NP+_{OUT}$, $NP-_{OUT}$, $SP+_{OUT}$, $SP-_{OUT}$). The circuits 141 and 142 may include switches that determine whether to connect network power input terminals $NP+_{IN}$, $NP-_{IN}$ directly to power output terminals $NP+_{OUT}$, $NP-_{OUT}$ and thus bypassing the power tap injection circuitry. The circuits 143 and 144 may include switches that determine whether to connect switched power input terminals $SP+_{IN}$, $SP-_{IN}$ directly to power output terminals $SP+_{OUT}$, $SP-_{OUT}$ and thus bypassing the power tap injection circuitry. Additionally, one or more of the circuits 141, 142, 143, and 144 may include bypass switches controlled by the microcontroller to selectively bypass a network power or a switched power from an incoming side of a network cable to an outgoing side of the network cable through the intelligent power tap 100. Alternatively or additionally, the microcontroller 112 may also control the one or more bypass switches 141, 142, 143, and 144 based on configurations of the adjustable configuration mechanism 116 or a configuration message from the communication network. Alternatively or additionally, the one or more bypass switches 141, 142, 143, and 144 may be controlled directly by the adjustable configuration mechanism 116.

At least one of the plurality of circuits 141, 142, 143, and 144 may include a configuration circuitry that defines a direction of power injection according to a power switching command from the microcontroller. For example, the plurality of circuits 141, 142, 143, and 144 may be controlled by the microcontroller 112, based upon the adjustable configuration mechanism 116, to define the direction of power injection.

The intelligent power tap 100 may further include a plurality of directional inject switches 145, 146, 147, and 148 connected to the output power terminals (NP+, NP−, SP+, SP−). The NP inject switches 145 and 146 determine whether to inject network power while the SP inject switches 147 and 148 determine whether to inject switched power. For example, one or more of the directional inject switches 145, 146, 147, and 148 may be controlled by the microcontroller 112 to selectively inject a power from an incoming power cable to an outgoing network cable connected to the intelligent power tap 100. Alternatively or additionally, the one or more directional inject switches 145, 146, 147, and 148 may be controlled by the microcontroller based upon the adjustable configuration mechanism 116 or a configuration message from the communication network.

Alternately, or additionally, when the bypass circuits 141, 142, 143 and 144 and the directional inject switches 145, 146, 147 and 148 are controlled from the microcontroller 112, the determination of how the switch circuits will be configured may come from either the adjustable configuration mechanism 116 settings, or it may come from a network communications command, depending on the setting of a mechanical configuration switch 119.

Figure 1B:
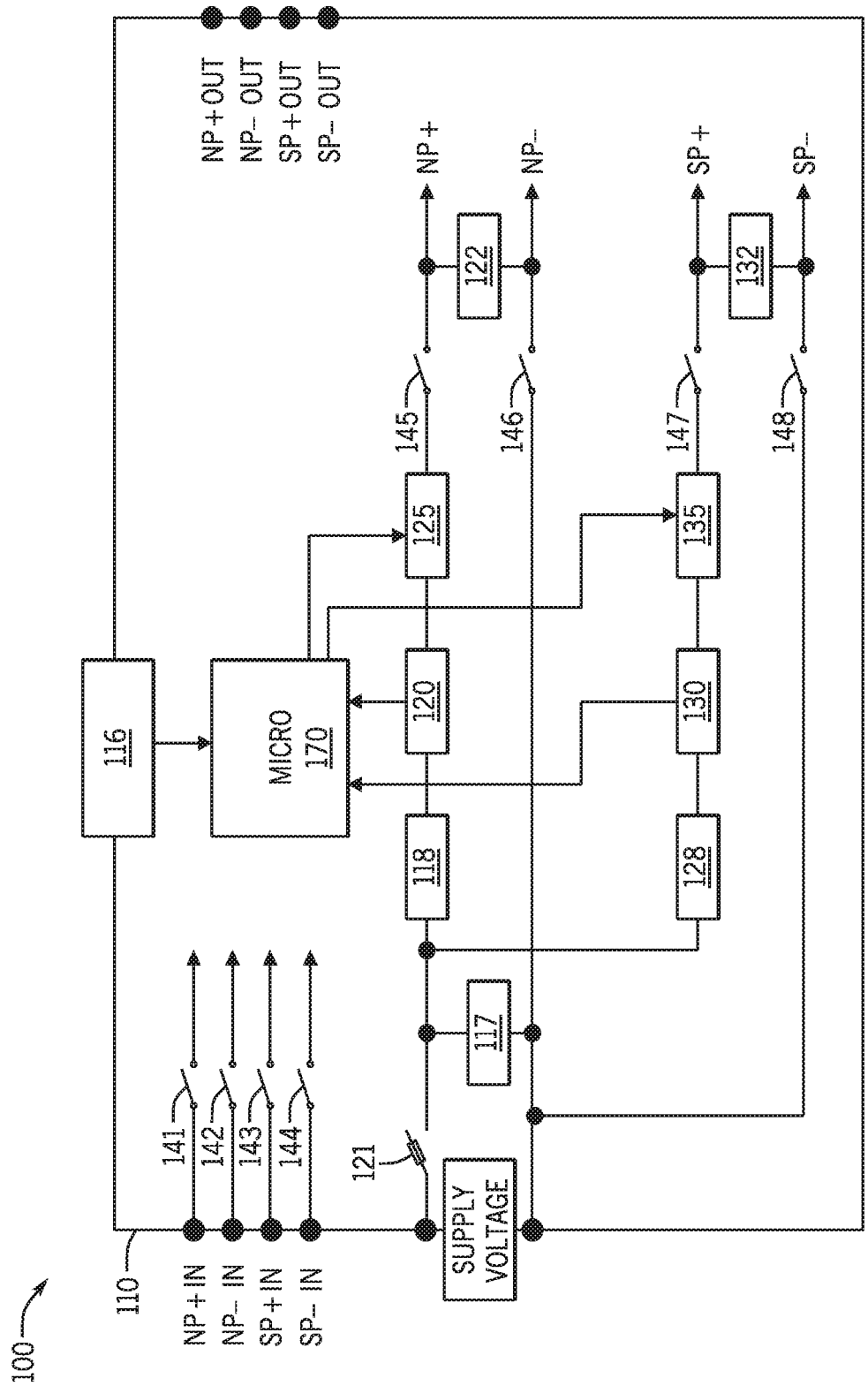
FIG. 1B illustrates a second example power tap according to one or more embodiments of the instant application.

FIG. 1B illustrates a second example power tap 100 according to one or more embodiments of the instant application. One of the differences between FIG. 1A and FIG. 1B is that the example power tap 100 does not include a network communication interface. It includes a non-communication enabled microcontroller 170 disposed on the circuit board.

In FIG. 1B, the non-communication enabled microcontroller 170 may be configured to receive input from the adjustable configuration mechanism 116 which may include a user interface controlled by the non-communication enabled microcontroller 170 to define the power tap's function in the network system according to the configuration instruction. In this example, the one or more directional inject switches 145, 146, 147, or 148, and the one or more bypass switches 141, 142, 143, or 144 may be controlled by the non-communication enabled microcontroller 170.

Figure 1C:
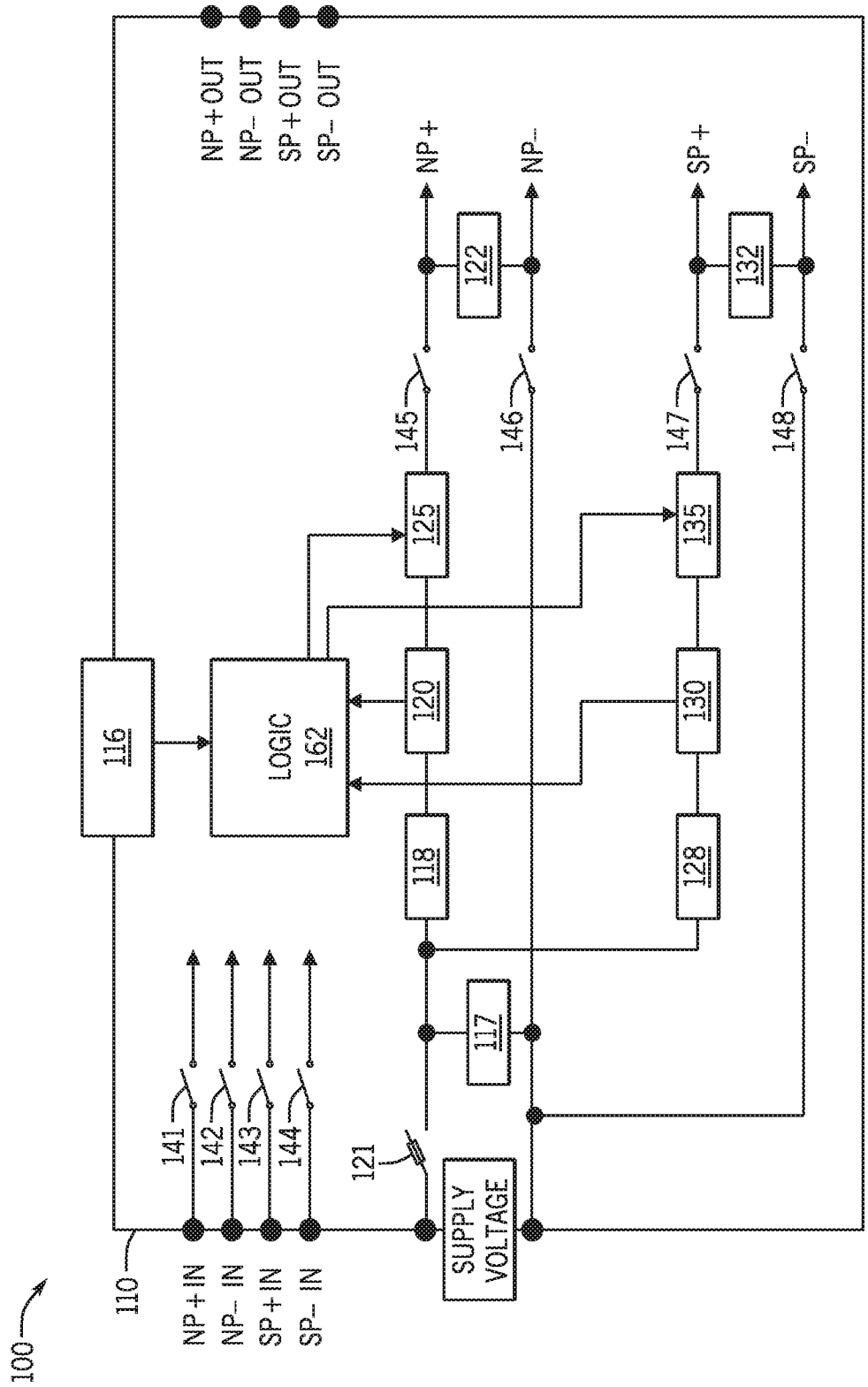
FIG. 1C illustrates a third example power tap according to one or more embodiments of the instant application.

FIG. 1C illustrates a third example power tap according to one or more embodiments of the instant application. One of the differences between FIG. 1B and FIG. 1C is that the example power tap 100 does not include a non-communication enabled microcontroller 170 disposed on the circuit board. Instead, it includes discrete logic 162. In FIG. 1C, the discrete logic 162 monitors the adjustable configuration mechanism 116 and controls the one or more directional inject switches 145, 146, 147, or 148, and the one or more bypass switches 141, 142, 143, or 144 according to the adjustable configuration 116.

Figure 2:
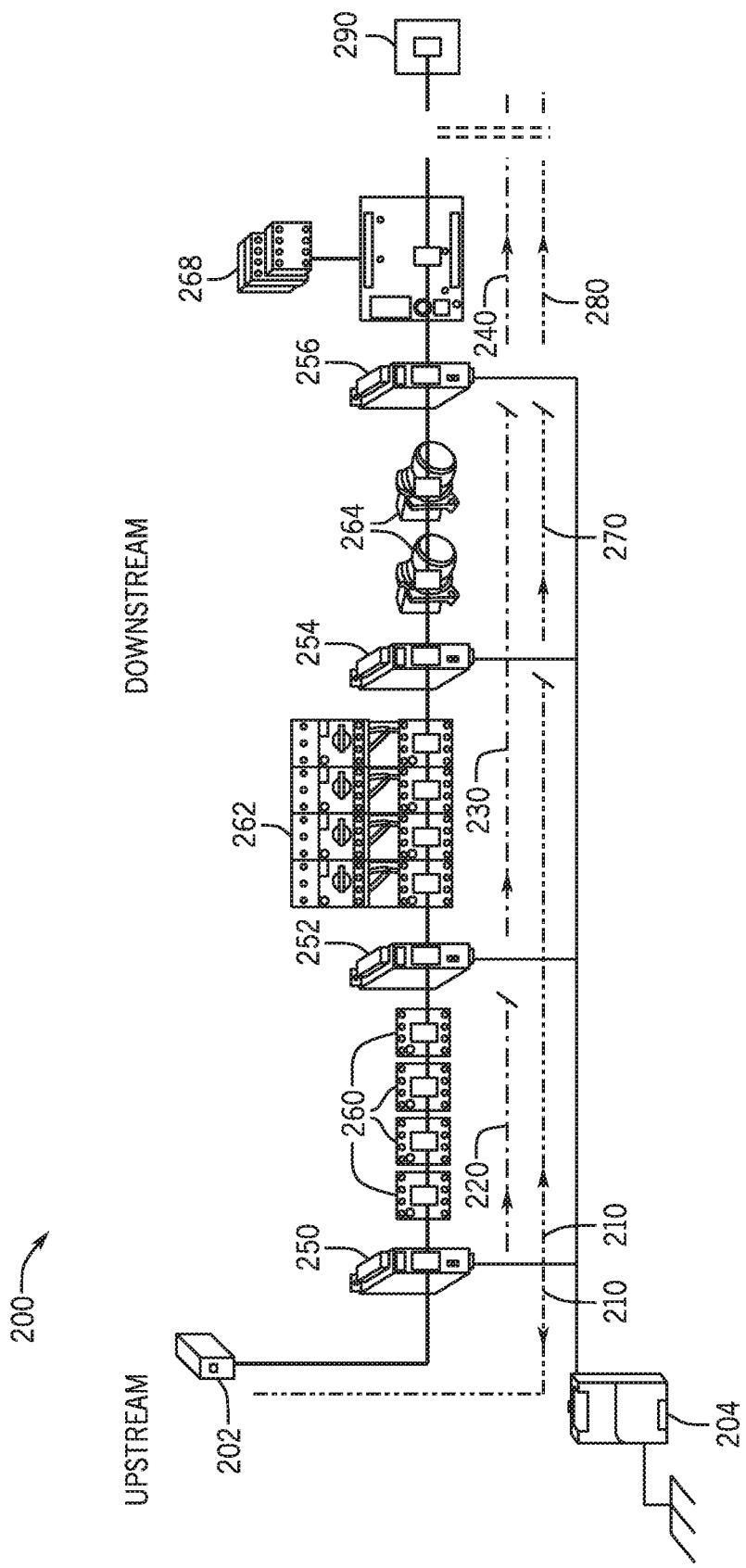
FIG. 2 illustrates an example system according to one or more embodiments of the instant application.

FIG. 2 illustrates an example system 200 according to one or more embodiments of the instant application. The system 200 includes a network power zone 210 and a switched power zone 220. The system 200 may include additional network power zones 270 and 280. The system 200 may include additional switched power zones 230 and 240. The network power zones may not overlap with each other. The switched power zones may not overlap with each other. The network power zone 210 may overlap with one of the switched power zones 220, 230, or 240. The network power zone 210 includes one or more devices such as power taps 250, 252, relays 260, and starters 262. The network power zone 270 includes one or more devices such as power taps 254, push buttons 264. The network power zone 280 includes one or more devices such as power taps 256 and safety devices 268. The switched power zone 220 may overlap with one of the network power zones 210, 270, or 280. The switched power zone 220 includes one or more devices such as power taps 250, and relays 260. The switched power zone 230 includes one or more devices such as power taps 252, 254, motor starters 262 and push buttons 264. The switched power zone 240 includes one or more devices such as power taps 256 and safety devices 268.

The system 200 may also include additional network power zones which may not overlap with each other, but may overlap the switched power zones. The system 200 may also include additional switched power zones which may not overlap with each other, but may overlap the network power zones.

The system 200 may further include an intelligent power tap 250, 252 254, or 256 which may be configured to inject network power to the network power zone 210, 270, and 280, or inject switched power to the switched power zones 220, 230, and 240. A master device 202 is connected to the intelligent power tap 250, which is configured to provide the geographical location on the network of the intelligent power tap, such as 250, to the master device 202.

Each of the intelligent power taps 250, 252, 254, and 256 is further configured to provide diagnostics information to the master device in real time. The microcontroller is configured to send prognostics information to the master device 202 when receiving a request from the master device 202, or on a routine basis At least one intelligent power tap may have a similar structure as the power tap 100 shown in FIG. 1A, which includes a circuit board; a microcontroller disposed on the circuit board; and a physical layer network interface connected to the microcontroller and a physical network. Further, the intelligent power tap 252 and 254 may be configured to inject network power or switched power only. At least one of the intelligent power taps 250, 252, 254, and 256 is further configured to provide diagnostics information to the master device in real time. The microcontroller is configured to send prognostics information to the master device 202 when receiving a request from the master device 202, or on a routine basis.

At least one of the intelligent power taps 250, 250, 254, and 256 may send one of the following warnings to other control devices in the network: an over-voltage warning when at least one of the network voltage and the switched voltage is greater than a preset upper voltage limit; an under-voltage warning when at least one of the network voltage and the switched voltage is lower than a preset lower voltage limit; an over-current warning when at least one of the network current and the switched current is greater than a preset upper current limit; and an under-current warning when at least one of the network current and the switched current is lower than a preset lower current limit.

Figure 3:
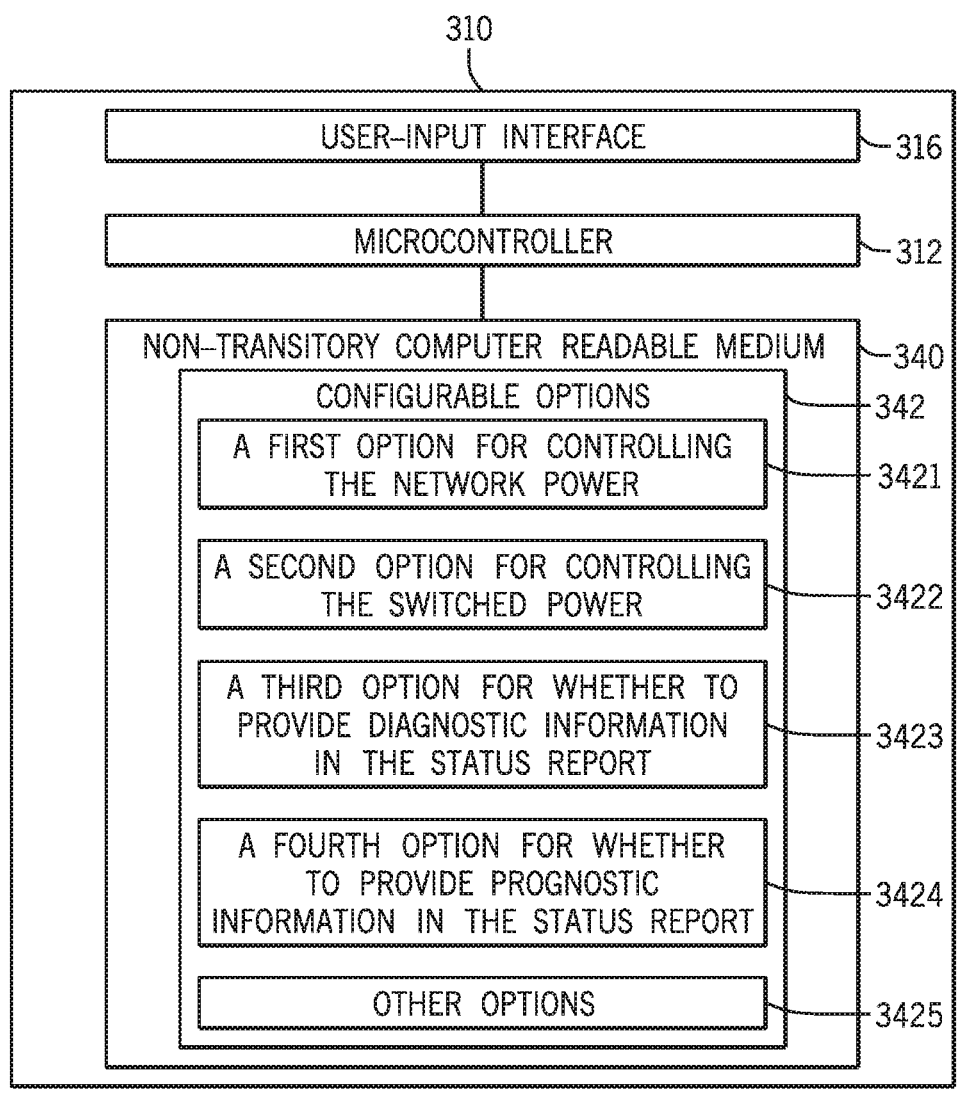
FIG. 3 illustrates an example tap according to one or more embodiments of the instant application.

FIG. 3 illustrates an example intelligent power tap 310 according to one or more embodiments of the instant application. The example intelligent power tap 310 includes a microcontroller 312 and a non-transitory storage computer readable medium 340, which include a plurality of configurable options 342. For example, the configurable options 342 may include one or more options that are configurable over the network system.

In FIG. 3, the options 342 include at least one of the following options: a first option 3421 for controlling the network power; a second option 3422 for controlling the switched power; a third option 3423 for whether to provide diagnostic information in the status report; and a fourth option 3424 for whether to provide prognostic information in the status report. The options 342 may further include other options 3425. The other options 3425 may store the options according to the adjustable configuration mechanism 116. The options 3425 may further store options according to configuration instruction received by the microcontroller 312.

When the first option 3421 is selected, the microcontroller 312 may receive additional configuration from a master device enabling it to decide whether to shut off the network power based on the received additional parameter. When the second option 3422 is selected, the microcontroller 312 may receive additional configuration from a master device enabling it to decide whether to shut off the switched power based on the received additional configuration.

When the third option 3423 is selected, the microcontroller 312 may receive diagnostic information from one or more sensors in the example tap 310 and then provide diagnostic information in the status report to a master device or a node. When the fourth option 3424 is selected, the microcontroller 312 may receive diagnostic information from one or more sensors in the example tap 310 and then provide prognostic information in the status report to a master device or a node.

The prognostics information may include at least one of the following: an over-voltage warning when at least one of the network voltage and the switched voltage is greater than a preset upper voltage limit; an under-voltage warning when at least one of the network voltage and the switched voltage is lower than a preset lower voltage limit; an over-current warning when at least one of the network current and the switched current is greater than a preset upper current limit; and an under-current warning when at least one of the network current and the switched current is lower than a preset lower current limit. The prognostics information may also include an over-current warning based on a self identification of the zone devices and their current characteristics.

The example tap 310 may also include a user-input interface 316 configured to receive current characteristics of a zone device, where the prognostics information may include: a second over-current warning based on the current characteristics of the zone device provided via the user-input interface.

Figure 4:
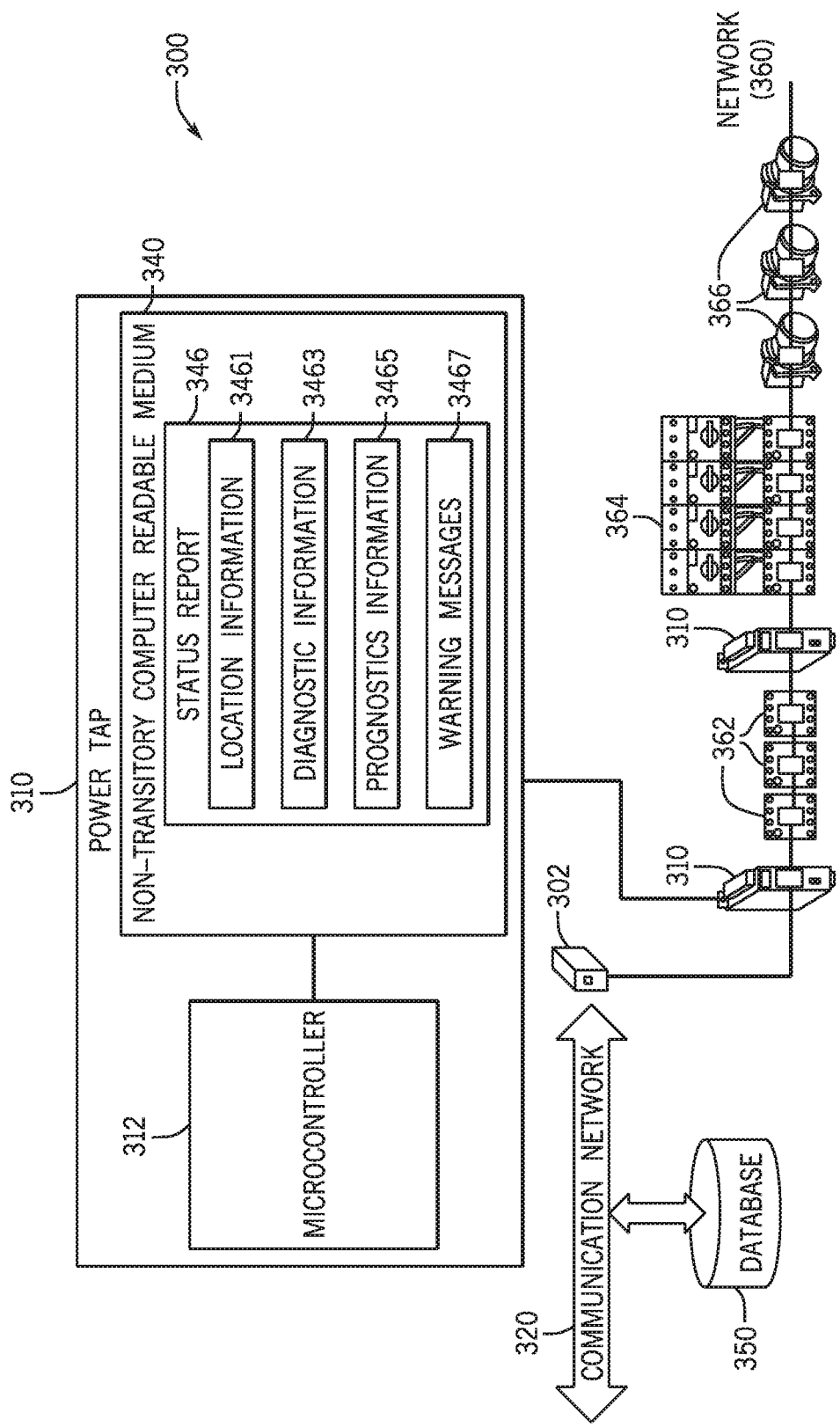
FIG. 4 illustrates an example network system according to one or more embodiments of the instant application.

FIG. 4 illustrates an example network system 300 according to one or more embodiments of the instant application. The network system 300 includes a network 360 consisting of a power tap 310. The power tap 310 includes a microcontroller 312 and a non-transitory computer readable medium 340. The communication network 320 may also be connected to a database 350 to record the usage information, diagnostic information, and prognostic information from the power tap 310.

Here, the power tap 310 may provide a status report 346 to one or more nodes in the network 360, which include a plurality of network nodes including relays 362, starter 364, etc. The power tap 310 also provides a status report to a communications bridge 302, which makes the information available to the communication network 320 so that the information may be stored in a database 350. The status report 346 includes location information 3461, diagnostic information 3463, prognostics information 3465, and one or more warning messages 3467.

For example, the prognostics information 3465 may include an over-current warning based on a self identification of a zone device and its current characteristics. The prognostics information 3465 may further include a second over-current warning based on the current characteristics of the applicable zone devices provided via the user-input interface.

Figure 5:
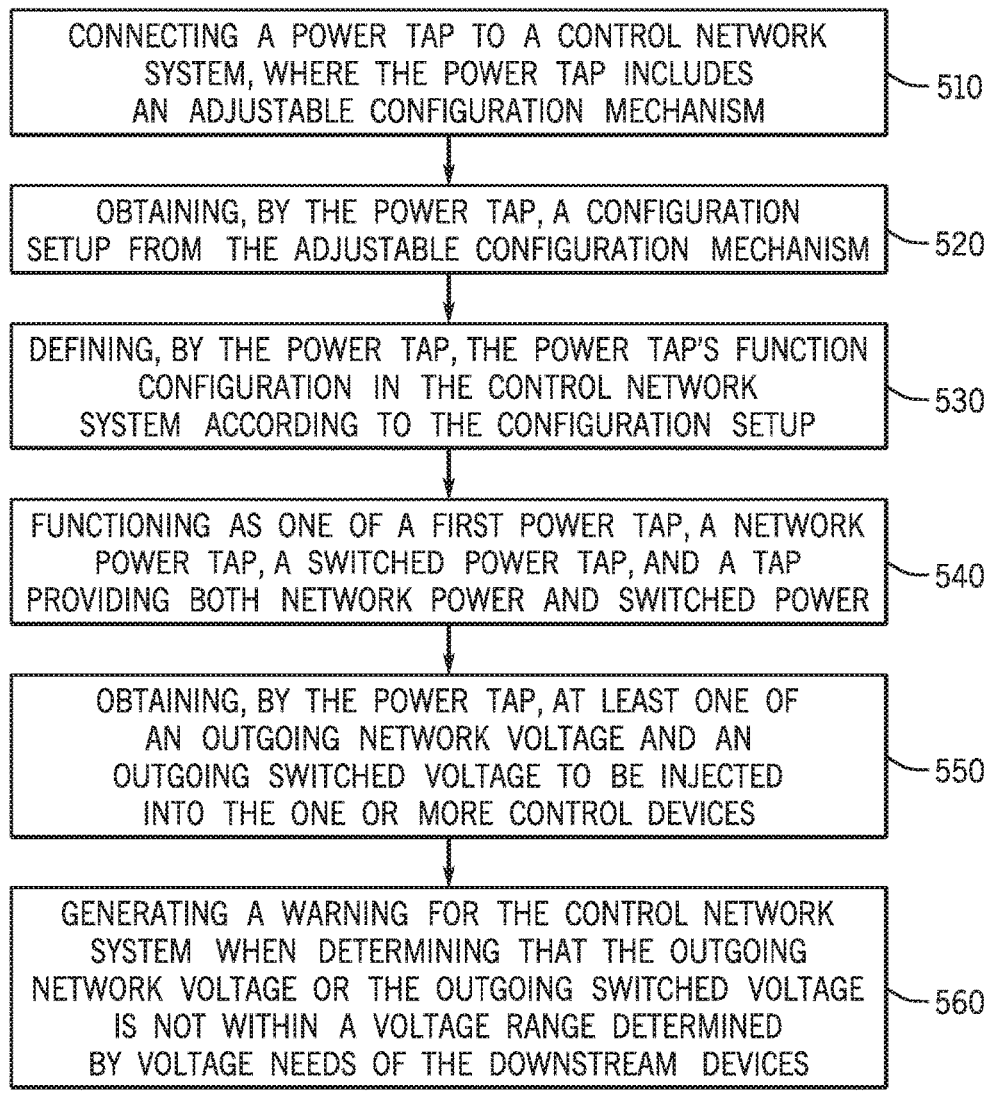
FIG. 5 illustrates an example flow chart according to one or more embodiments of the instant application.

FIG. 5 illustrates an example flow chart according to one or more embodiments of the instant application. The method 500A may be implemented by the intelligent power tap disclosed above. The method 500A may include additional acts if needed. It is not required that the acts in the flow chart to be executed as the specified order.

In act 510, an intelligent power tap is connected to a control network system, where the intelligent power tap may include an adjustable configuration mechanism. In act 520, the power tap obtains a configuration setup from the adjustable configuration mechanism. In act 530, the power tap defines the power tap's function in the control network system according to the configuration setup.

In act 540, the power tap functions as one of a first power tap, a network power tap, a switched power tap, and a tap providing both network power and switched power. In act 550, the power tap obtains at least one of an outgoing network voltage and an outgoing switched voltage to be injected into the one or more control devices. In act 560, the power tap generates a warning for the control network system when determining that the outgoing network voltage or the outgoing switched voltage is not within a voltage range determined by voltage needs of the downstream devices.

Figure 6:
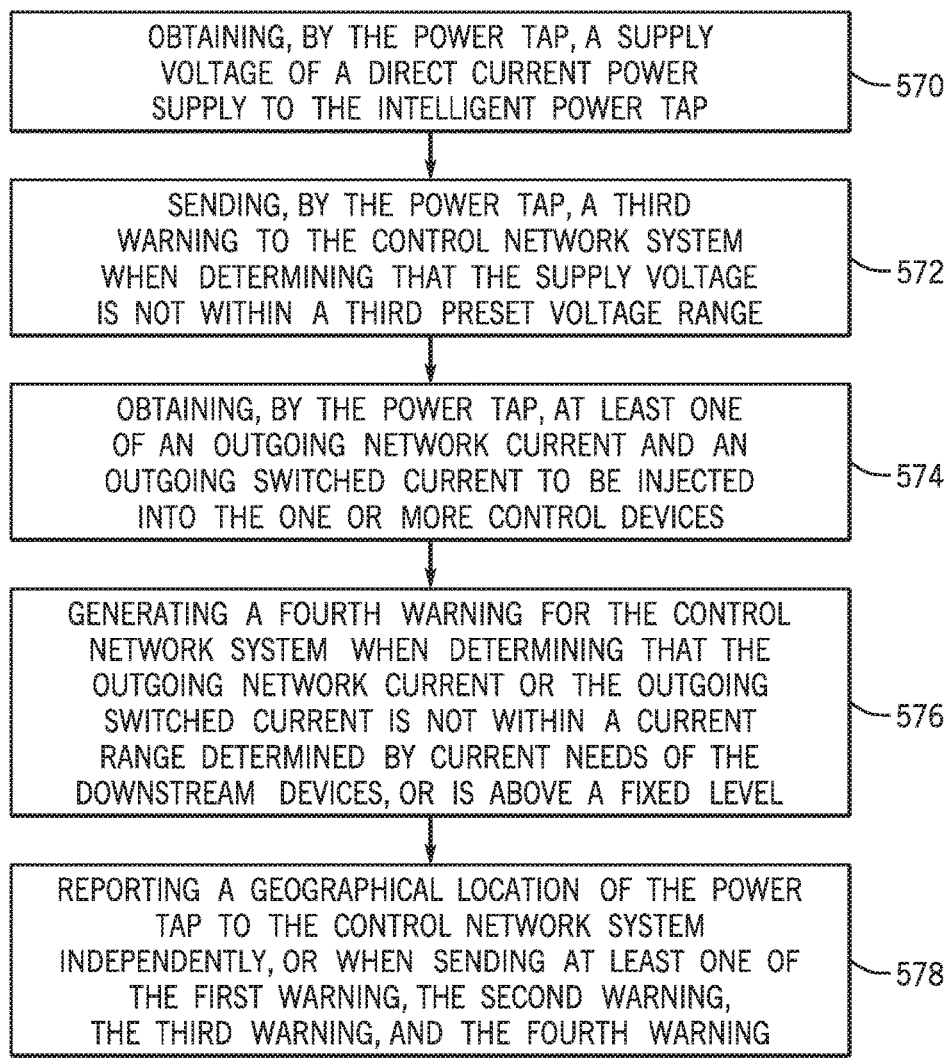
FIG. 6 illustrates additional acts in an example flow chart according to one or more embodiments of the instant application.

FIG. 6 illustrates additional acts in an example flow chart according to one or more embodiments of the instant application.

In act 570, the power tap obtains a supply voltage to the power tap. In act 572, the power tap sends a third warning to the control network system when determining that the supply voltage is not within a third preset voltage range. In act 574, the power tap obtains at least one of an outgoing network current and an outgoing switched current to be injected into the one or more control devices. In act 576, the power tap generates a fourth warning for the control network system when determining that the outgoing network current or the outgoing switched current is not within a current range determined by current needs of the downstream devices, or is above a fixed level. In act 578, the power tap reports a geographical location of the power tap to the control network system independently, or when sending at least one of the first warning, the second warning, the third warning, and the fourth warning.

The adjustable power tap enables a user to select and/or define the adjustable power tap's configuration. The "Directional Inject" and "Bypass" switches in the adjustable power tap may be controlled by the microcontroller based upon the selected tap configuration. For example, the adjustable power tap may selectively inject NP+/− onto the 'left/incoming' ribbon cable, NP+/− onto the 'right/outgoing' ribbon cable, and SP+/− onto the 'right/outgoing' ribbon cable. The adjustable power tap may selectively bypass NP+/− and/or SP+/− from the incoming to outgoing applicable lines of the ribbon cable. When the adjustable power tap includes a "Shutoff" switch, the "Inject" relay/switch may be eliminated. For example, the "Shutoff" relay/switch can connect the NP and/or SP output directly to the outgoing NP and/or SP terminal. In that case, the "Bypass" relay/switch may be added and can connect the NP and/or SP Input and output terminals.

An intelligent power tap could provide warning prognostics when/if the incoming voltage, or outgoing NP and/or SP voltage and/or current dips and/or exceeds a pre-defined default or user configured set point The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of embodiments of the disclosure. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the disclosure.

Although the above discussion discloses various exemplary embodiments of the disclosure, it should be apparent that those skilled in the art can make various modifications that will achieve some of the advantages of the disclosure without departing from the true scope of the disclosure.

We claim:

1. An intelligent power tap in a network system, comprising:
    a circuit board;
    a microcontroller disposed on the circuit board, wherein the microcontroller is configured to report the geographical location of the intelligent power tap;
    a physical layer network interface connected to the microcontroller and the network system;
    an adjustable configuration mechanism connected to the microcontroller, with the adjustable configuration mechanism defining the intelligent power tap's function in the network system; and
    one or more directional inject switches controlled by the microcontroller to selectively inject at least one of a network power and a switched power from a power source to an outgoing network cable connected to the intelligent power tap.

2. The intelligent power tap of claim 1, wherein the function comprises one of the following:
    a first power tap, a network power tap, a switched power tap, and a tap injecting both network power and switched power.

3. The intelligent power tap of claim 1, further comprising:
    one or more directional inject switches controlled by the microcontroller to selectively inject a switched power from an incoming power supply cable to an outgoing network cable connected to the intelligent power tap.

4. The intelligent power tap of claim 1, further comprising:
    one or more bypass switches controlled by the microcontroller to selectively bypass a network power or a switched power from an incoming side of a network cable to an outgoing side of the network cable through the intelligent power tap.

5. The intelligent power tap of claim 1, further comprising:
    one or more directional inject switches controlled by the microcontroller, based upon the adjustable configuration mechanism or a configuration message from the communication network, to selectively inject a network power from an incoming power supply cable to an outgoing network cable connected to the intelligent power tap.

6. The intelligent power tap of claim 1, further comprising:
    one or more directional inject switches controlled by the microcontroller, based upon the adjustable configuration mechanism or a configuration message from the communication network, to selectively inject a switched power from an incoming power supply cable to an outgoing network cable connected to the intelligent power tap.

7. The intelligent power tap of claim 1, further comprising:
    one or more bypass switches controlled by the microcontroller, based upon the adjustable configuration mechanism or a configuration message from the communication network, to selectively bypass a network power or a switched power from an incoming side of a network cable to an outgoing side of a network cable through the intelligent power tap.

8. A power tap in a network system, comprising:
    a circuit board;
    an adjustable configuration mechanism that independently defines the power tap's function in the network system; and
    one or more directional inject switches configured to selectively inject network power from a power source to an outgoing network cable connected to the power tap.

9. The power tap of claim 8, wherein the function comprises one of the following:
    a first power tap, a network power tap, a switched power tap, and a tap providing both network power and switched power.

10. The power tap of claim 8, further comprising:
    one or more directional inject switches configured to selectively inject switched power from an incoming power supply cable to an outgoing network cable connected to the power tap.

11. The power tap of claim 8, further comprising:
    one or more bypass switches configured to selectively bypass a network power or a switched power from an incoming side of a network cable to an outgoing side of a network cable through the power tap.

12. The power tap of claim 11, wherein the one or more directional inject switches and the one or more bypass switches are controlled by discrete logic according to the function defined by the adjustable configuration mechanism.

13. The power tap of claim 8, wherein the adjustable configuration mechanism comprises at least one of the following:
    a rotary switch, a dip switch, a rotary knob, a switch knob, and a touch screen.

14. A power tap in a network system, comprising:
    a circuit board;
    a non-communication enabled microcontroller disposed on the circuit board;
    an adjustable configuration monitored by the non-communication enabled microcontroller to define the power tap's function in the network system according to a configuration instruction; and
    one or more directional inject switches controlled by the non-communication enabled microcontroller to selectively inject a network power from a power source to an outgoing network cable connected to the power tap.

15. The power tap of claim 14, wherein the function comprises one of the following:
    a first power tap, a network power tap, a switched power tap, and a tap providing both network power and switched power.

16. The power tap of claim 14, further comprising:
    one or more directional inject switches controlled by the non-communication enabled microcontroller to selectively inject a switched power from an incoming power supply cable to an outgoing network cable connected to the power tap.

17. The power tap of claim 14, further comprising:
one or more bypass switches controlled by the non-communication enabled microcontroller to selectively bypass a network power or a switched power from an incoming side of a network cable to an outgoing side of a network cable through the power tap.

* * * * *